F. G. STEPHENSON.
BOAT COMPASS.
APPLICATION FILED SEPT. 18, 1911.
1,043,478.
Patented Nov. 5, 1912.
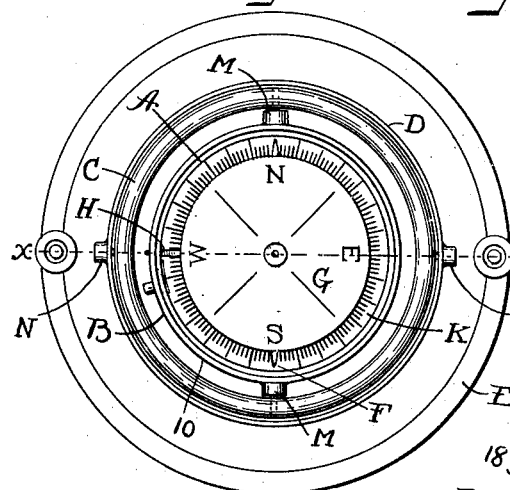
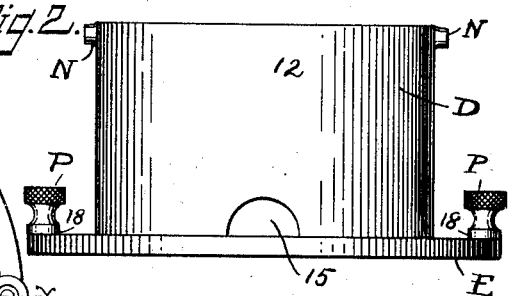
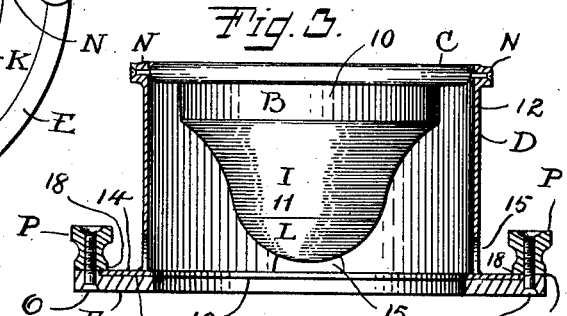
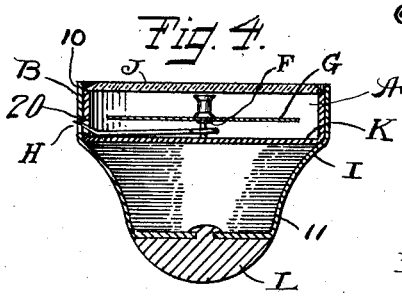
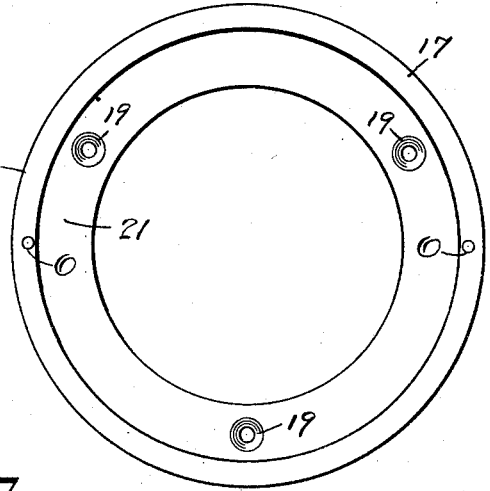
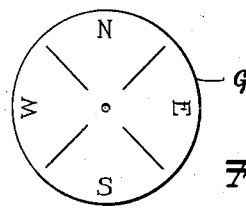
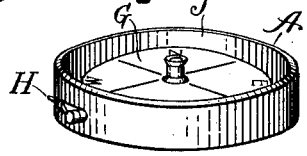
Witnesses:
S. H. Clarke
Roger W. Edwards
Inventor
Frederick G. Stephenson
By Louis W. Schmidt
Atty.

UNITED STATES PATENT OFFICE.

FREDERICK G. STEPHENSON, OF PLAINVILLE, CONNECTICUT, ASSIGNOR TO OSBORNE AND STEPHENSON MANUFACTURING COMPANY, OF PLAINVILLE, CONNECTICUT, A CORPORATION.

BOAT-COMPASS.

1,043,478.

Specification of Letters Patent. Patented Nov. 5, 1912.

Application filed September 18, 1911. Serial No. 649,972.

*To all whom it may concern:*

Be it known that I, FREDERICK G. STEPHENSON, a citizen of the United States, residing at Plainville, in the county of Hartford and State of Connecticut, have invented certain new and useful Improvements in Boat-Compasses, of which the following is a specification.

My invention relates to improvements in boat compasses and the objects of my improvement are simplicity and economy in construction and convenience and efficiency in use, and has particular reference to producing a compass that is suited for rough service and can be readily put into position for use and removed for storage or safe keeping.

In the accompanying drawing:—Figure 1 is a plan view of my improved boat compass. Fig. 2 is a side elevation of the same. Fig. 3 is a sectional view on the line $xx$ of Fig. 1, certain parts being shown in side elevation. Fig. 4 is a similar view of the compass member. Fig. 5 is a plan view of the supporting ring. Fig. 6 is a plan view of the compass card. Fig. 7 is a perspective view of the compass proper.

My boat compass comprises a compass proper A mounted as an essentially fixed part of a compass member B and which compass member is universally mounted by means of a gimbal ring C in a casing D and furthermore the casing is removably and adjustably supported in a ring support, which latter may be fixedly located at any point desired. The said compass proper A is a self contained unit of the watch case or pocket type or other style or size of compass comprising the usual cylindrical outer wall and flat bottom wall suitable for operatively housing the magnetic compass needle F and the glass or other transparent top J, the bottom being marked on the upper surface as a dial or index plate K, and may be provided with the usual stop mechanism H for raising the needle hub against the glass J, and in addition to these usual features, I provide a card G, shown as between the needle F and the supporting hub, which moves with the needle and is suitably marked to coöperate with the markings of the fixed index plate K to indicate the course.

The compass member B comprises a shell I which has a cylindrical upper portion 10 that is a fit for and suitable to receive and hold the said compass proper A. Below said upper cylindrical portion 10, the walls 11 converge, the extreme lower end being flattened as shown and having secured thereto a weight L. The outer wall of the weight L and the wall 11 are shaped to provide a rounded bottom for the compass member B. The weight L is suitably below the pivots M that support the compass member B from the gimbal ring C to maintain the needle F in proper operative position under changing conditions of the gimbal ring C and the supports therefor.

A hole 20 is provided in the side of the cylindrical upper portion 10 of the shell I to admit the handle of the stop mechanism H, whereby the compass proper A may be inserted in the said upper cylindrical portion 10, and the same constitutes when in use, as stated, an essentially fixed part of the compass member B, and at the same time can be removed and replaced if desired as in case of breakage or for any other special reason. The said gimbal ring C is connected in the ordinary manner by a pair of diametrically located pivots N to the casing D. Other than the window J, which is of glass, the elements that compose my compass member B are made of metal, including the index plate K and the card G. The latter card element I make of aluminum or other light non-magnetic material, and I thereby provide a card that is light and also durable, being practically indestructible under the usual conditions of usage. The said casing D is generally cylindrical, and comprises a cylindrical upper and body portion 12 which constitutes the casing proper and has the said gimbal ring pivots N at the upper end, and at the lower end has a circular base plate 13, which extends outward radially beyond the said cylindrical body portion 12 in the form of an annular flange 14. A plurality of outlet holes 15 is provided in the said cylindrical body portion 12 at the junction of the same with the said base plate 13 and flange 14 and which serve to permit the escape of water that may be splashed over the compass A and into the casing I. The said ring support E comprises an annular plate or ring suitable to receive and support the said flange 14, is larger in outside diameter than the said flange 14, and is provided with a depression 21 that is a fit for the said flange diametrically, and suitable for receiving and posiing the same, and also is of depth corresponding to the thickness of the said flange 14, whereby the upper surface of the flange 14 will be essentially flush with the upper surface 16 of the adjacent annular inclosing wall 17 of the ring support E.

As described the flange 14 will be positively supported and positioned laterally in the ring support E and may be turned therein on its axis, to any angular position desired relatively to the said ring support E. As locking means, I provide a pair of studs O extending upward from the said inclosing wall 17 and adjacent the said annular recess 21, and a pair of locking nuts P suitable for engaging therewith and which nuts P have bases 18 of sufficient diameter to overhang the said inclosing wall 17 inwardly and the recess 21 and accordingly suitable for engaging with the flange 14 when resting in the said recess. Screw holes 19 in the recess portion 21 of the ring support E are provided suitably for receiving holding screws. Accordingly, as described, the locking nuts P coöperate with the annular recess 21 in securing the compass member B in any angular position desired relatively to the fixed support or ring support E. By providing sufficient length for the studs O, a slight unscrewing of the nuts P, without removing them from engagement with the said studs O, permits of separating the casing D from the ring support E.

As described, my boat compass is constructed in a simple and compact manner, is suited to withstand rough usage, including exposure to the elements, the casing and the moving elements are readily adjustable in annular position; and the means of such adjustment serve to permit of readily separating the said housing and moving parts from the fixed support.

I claim as my invention:—

1. A boat compass comprising a compass member and a casing in which the same is operatively mounted, and means for adjustably supporting the said casing, the said means comprising an annular flange at the lower end of the said casing and a ring support having a recess fitting the said flange, and suitable for receiving the same, and locking means comprising a plurality of studs extending from said ring support and adjacent the said recess and locking nuts engaging with the said studs, and having heads overhanging the said recess and suitable for engaging with the said flange when received in the said recess.

2. A boat compass comprising a compass member and a casing in which the same is operatively mounted and means for adjustably supporting the said casing and having an annular flange at the lower end serving as a supporting foot, a ring support provided with a recess fitting the said flange and suitable for receiving the same and permitting changing the relative annular position of the said compass and ring support while the said flange is received in the said recess and means for locking the said flange in the said recess at any position to which the same may be set relatively thereto.

FREDERICK G. STEPHENSON.

Witnesses:
   CHARLES B. KALISH,
   REUBEN W. SMITH.

---

Copies of this patent may be obtained for five cents each, by addressing the "Commissioner of Patents, Washington, D. C."